United States Patent
Yahav et al.

(10) Patent No.: US 10,160,471 B2
(45) Date of Patent: Dec. 25, 2018

(54) MOBILE STORAGE CONTAINER WITH PIVOTABLE HANDLE

(71) Applicant: The Stanley Works Israel Ltd., Rosh Ha'Ayin (IL)

(72) Inventors: Michal Yahav, Hod Hasharon (IL); Nir Evron, Yahood Monoson (IL); Danny Baruch, Lapid (IL); Elad Hay Shitrit, Tel Aviv (IL)

(73) Assignee: The Stanley Works Israel, LTD, Rosh Ha'Ayin (IL)

( * ) Notice: Subject to any disclaimer, the term of this patent is extended or adjusted under 35 U.S.C. 154(b) by 0 days.

(21) Appl. No.: 15/363,240

(22) Filed: Nov. 29, 2016

(65) Prior Publication Data

US 2017/0158216 A1  Jun. 8, 2017

Related U.S. Application Data

(60) Provisional application No. 62/263,445, filed on Dec. 4, 2015.

(51) Int. Cl.
| | | |
|---|---|---|
| *B62B 3/00* | (2006.01) | |
| *B62B 5/06* | (2006.01) | |
| *B25H 3/02* | (2006.01) | |
| *B62B 1/16* | (2006.01) | |

(52) U.S. Cl.
CPC ............. *B62B 5/065* (2013.01); *B25H 3/02* (2013.01); *B62B 1/16* (2013.01)

(58) Field of Classification Search
CPC .. B62B 1/12; B62B 1/16; B62B 5/065; B65D 21/0217; B65D 25/2835; B65D 43/16; B65D 2525/283
See application file for complete search history.

(56) References Cited

U.S. PATENT DOCUMENTS

| | | | |
|---|---|---|---|
| 5,226,553 A | 7/1993 | Fiore | |
| 6,053,587 A | 4/2000 | Boerder | |
| 6,431,580 B1 * | 8/2002 | Kady | B62B 1/12 |
| | | | 280/655 |
| 6,474,097 B2 * | 11/2002 | Treppedi | A45C 11/20 |
| | | | 280/30 |
| 7,389,608 B1 * | 6/2008 | MacKay | A01K 97/05 |
| | | | 206/315.11 |
| 7,997,595 B1 * | 8/2011 | Pope | B62B 1/16 |
| | | | 280/47.19 |
| 8,196,951 B2 * | 6/2012 | Blakeman | A45C 5/08 |
| | | | 280/30 |
| 8,720,656 B2 * | 5/2014 | Ready | A45C 5/03 |
| | | | 122/127 |

(Continued)

FOREIGN PATENT DOCUMENTS

| | | |
|---|---|---|
| FR | 2942444 A | 8/2010 |
| WO | 14125484 A | 8/2014 |

OTHER PUBLICATIONS

European Search Report dated Jul. 5, 2017.

*Primary Examiner* — Hau V Phan
(74) *Attorney, Agent, or Firm* — Bruce S. Shapiro (57) ABSTRACT

A rolling container includes a body having an upper opening, a lid pivotally coupled to the body, a wheel coupled to the body, configured for rolling the body thereon, a maneuvering handle pivotally coupled to the body, and a handle pivot mechanism configured to pivot the maneuvering handle away from the body when the lid is opened.

18 Claims, 12 Drawing Sheets

(56) References Cited

U.S. PATENT DOCUMENTS

| | | | |
|---|---|---|---|
| 8,740,010 B1* | 6/2014 | Page | F25D 3/06 |
| | | | 16/113.1 |
| 9,242,662 B2* | 1/2016 | Scott | B62B 1/16 |
| 2001/0030403 A1* | 10/2001 | Johnson | A01K 13/00 |
| | | | 280/47.26 |
| 2007/0194543 A1* | 8/2007 | Duvigneau | A45C 5/14 |
| | | | 280/47.26 |
| 2009/0266833 A1* | 10/2009 | Savage | A45C 13/385 |
| | | | 220/757 |
| 2010/0052276 A1 | 3/2010 | Brunner | |
| 2012/0326406 A1 | 12/2012 | Lifshitz et al. | |
| 2013/0031732 A1 | 2/2013 | Hess et al. | |
| 2013/0068776 A1* | 3/2013 | Patterson | A45F 3/46 |
| | | | 220/592.01 |
| 2013/0127129 A1 | 5/2013 | Bensman et al. | |
| 2013/0168882 A1* | 7/2013 | Lykins | F04D 29/705 |
| | | | 261/136 |

\* cited by examiner

MOBILE STORAGE CONTAINER WITH PIVOTABLE HANDLE

This application claims priority to U.S. Provisional Patent Application Ser. No. 62/263,445, filed Dec. 4, 2015, which is hereby incorporated herein by reference in its entirety.

FIELD OF THE INVENTION

This application relates to rolling storage containers, where the storage containers have one or more wheels for ease of transport, and a protruding handle for a user to push or pull on the mobile storage container to facilitate movement on the one or more wheels.

BACKGROUND OF THE INVENTION

Rolling storage containers are commonly used to carry a plurality of working tools to the working location. While some containers are configured to be mounted to a separate apparatus having wheels and a handle, such as in U.S. Pat. No. 8,567,796, incorporated by reference herein in its entirety, other containers have integral wheels and a handle. In some such containers having integral wheels and a handle, the handle's positioning relative to the body prevent or make cumbersome a preferred implementation of a pivotable lid, where the lid may pivot open from the body of the container against the handle. It may be appreciated that the footprint of the storage container would either need to be enlarged to give space for the lid to pivot open into, or a portion of the opening of the storage container would be blocked by the lid when the lid is pivoted into an open position. One conventional configuration of storage container with integral wheels and handle that endeavours to maximize the available space when the lid is opened is to forgo a pivotable lid altogether, and have the lid removable detachable from the body of the storage container. A disadvantage of such conventional storage containers is that once detached, the lid must be placed somewhere else while a user There is a need in the art for an improved storage container that includes both a pivotable lid integral wheels, and a handle for manoeuvring the storage container.

SUMMARY OF THE INVENTION

According to an embodiment: A rolling container includes a body having an upper opening, a lid pivotally coupled to the body, a wheel coupled to the body, configured for rolling the body thereon, a maneuvering handle pivotally coupled to the body, and a handle pivot mechanism configured to pivot the maneuvering handle away from the body when the lid is opened.

BRIEF DESCRIPTION OF THE DRAWINGS

Embodiments of the invention will now be described by way of example with reference to the drawings in which.

DETAILED DESCRIPTION OF THE INVENTION

Figure 1:
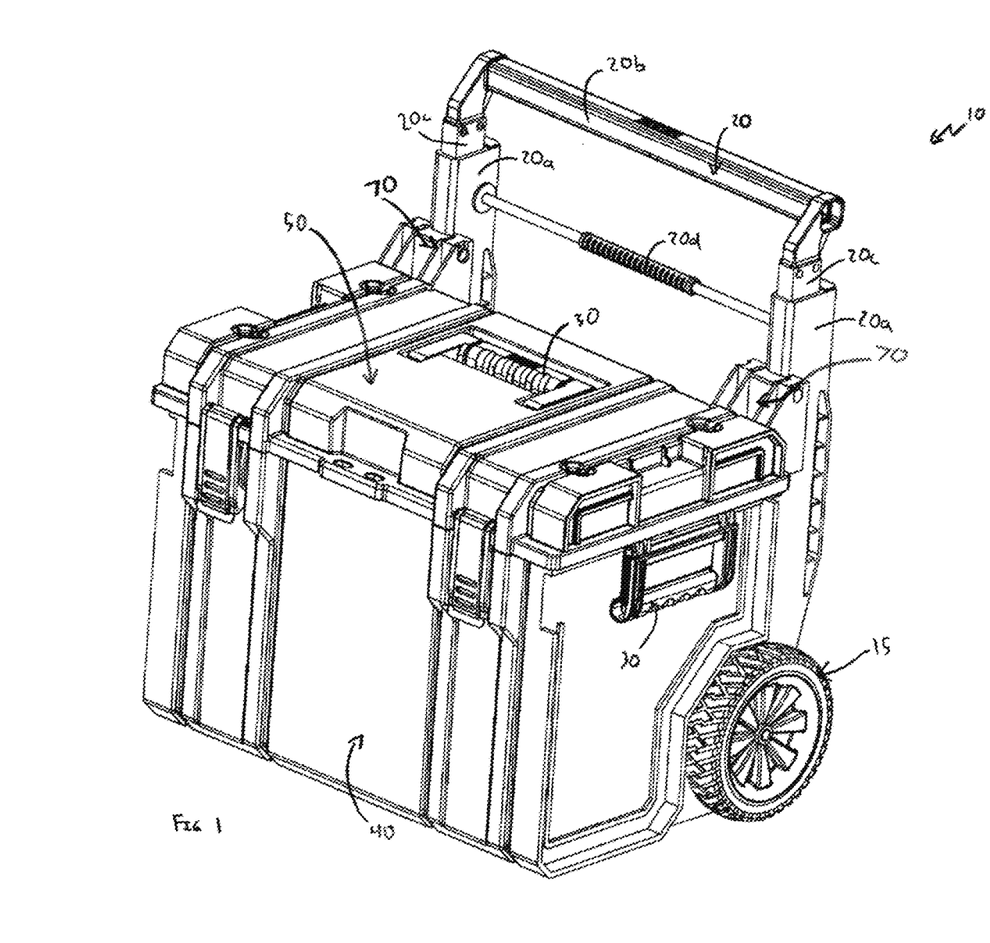
FIG. 1 illustrates a perspective view of a first embodiment of a rolling storage container, where a lid thereof is in a closed configuration and a handle thereof in a retracted configuration.
Figure 2:
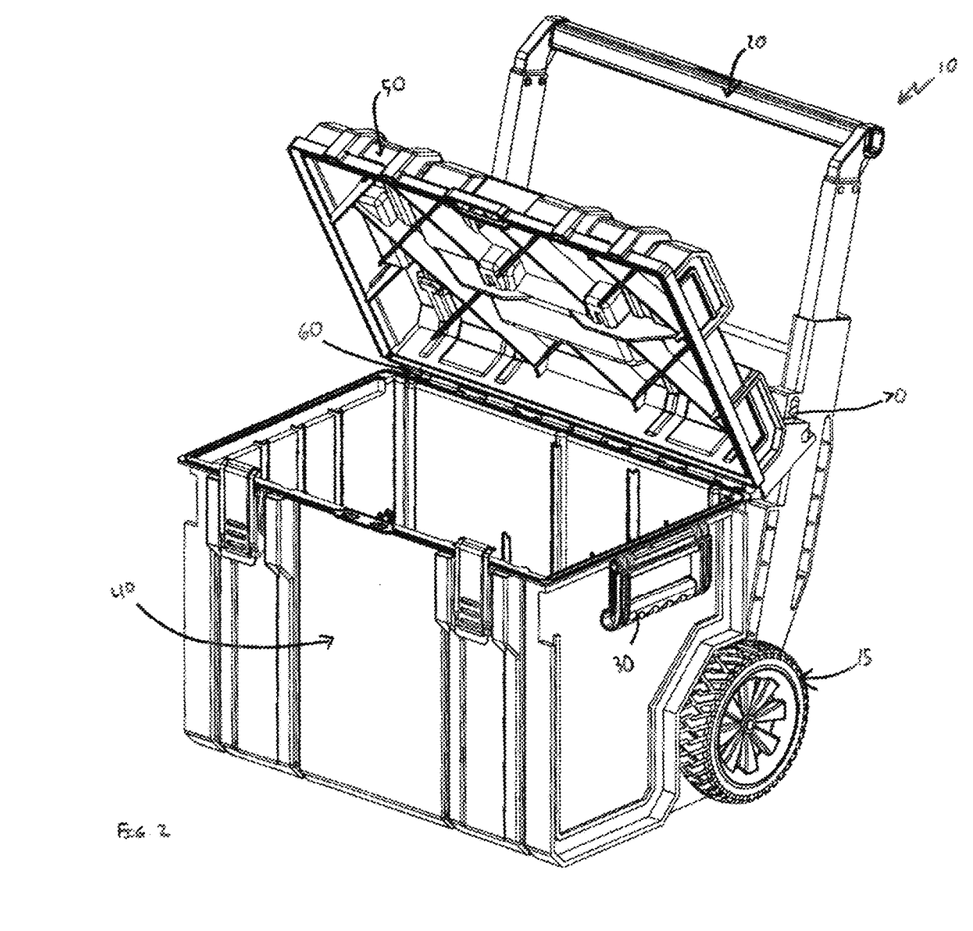
FIG. 2 illustrates a perspective view of the rolling storage container of FIG. 1, with the lid thereof in an open position and a handle thereof in an extended position.

As shown in FIGS. 1 and 2, an embodiment of a rolling storage container 10 may be configured with a maneuver handle 20 which may be used to push or pull the rolling storage container 10. As shown, the container 10 may be mounted on one or more wheels 15, such that pivoting the container 10 about the wheels 15 may allow pushing or pulling the container 10 via the maneuver handle 20. In an embodiment the container 10 may include one or more side and/or top carrying handles 30, allowing for lifting of the container 10. The container 10 may include a body 40 covered by a lid 50. As described in greater detail below, a bottom portion of the handle 20 may be pivotally coupled to the body 40. It may be appreciated from the differences between FIG. 1 (showing the container with the lid 50 thereof closed over the body 40) and FIG. 2 (showing the lid 50 thereof open from the body 40), the container 10 may configured such that pivoting the lid 50 from the closed configuration to the open configuration may pivot the maneuver handle 20 relative to the body 40 of the rolling container 10, so that the lid 50 of the rolling container 10 may be pivoted into a position previously occupied by the maneuver handle 20.

Figure 4:
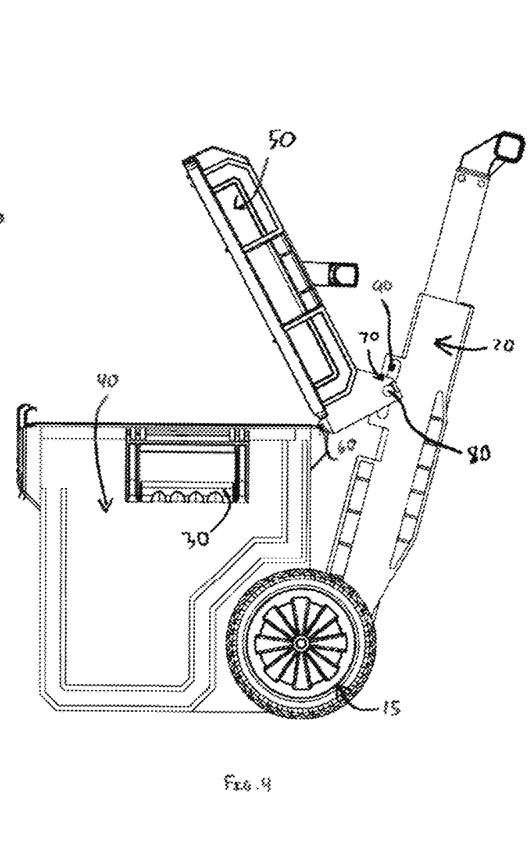
FIG. 4 illustrates a side view of the rolling storage container of FIG. 1, with the lid thereof in an open position and a handle thereof in an extended position.

In an embodiment, pivotable movement of the lid 50 may be accomplished through a hinge connection 60 between the lid 50 and body 40 of the container 10. As seen in FIG. 2 and the side view of FIG. 4, where the lid 50 is in a partially opened configuration, a handle pivot mechanism 70 associated with the handle 20 (as discussed below) may coordinate pivoting movement between the lid 50 and maneuver handle 20. In some embodiments, a handle pivot mechanism 70 may be associated with opposing sides of the container 10, while in other embodiments, a single handle pivot mechanism 70 may couple the lid 50 and the handle 20 (e.g., centralized relative thereto).

Figure 5:
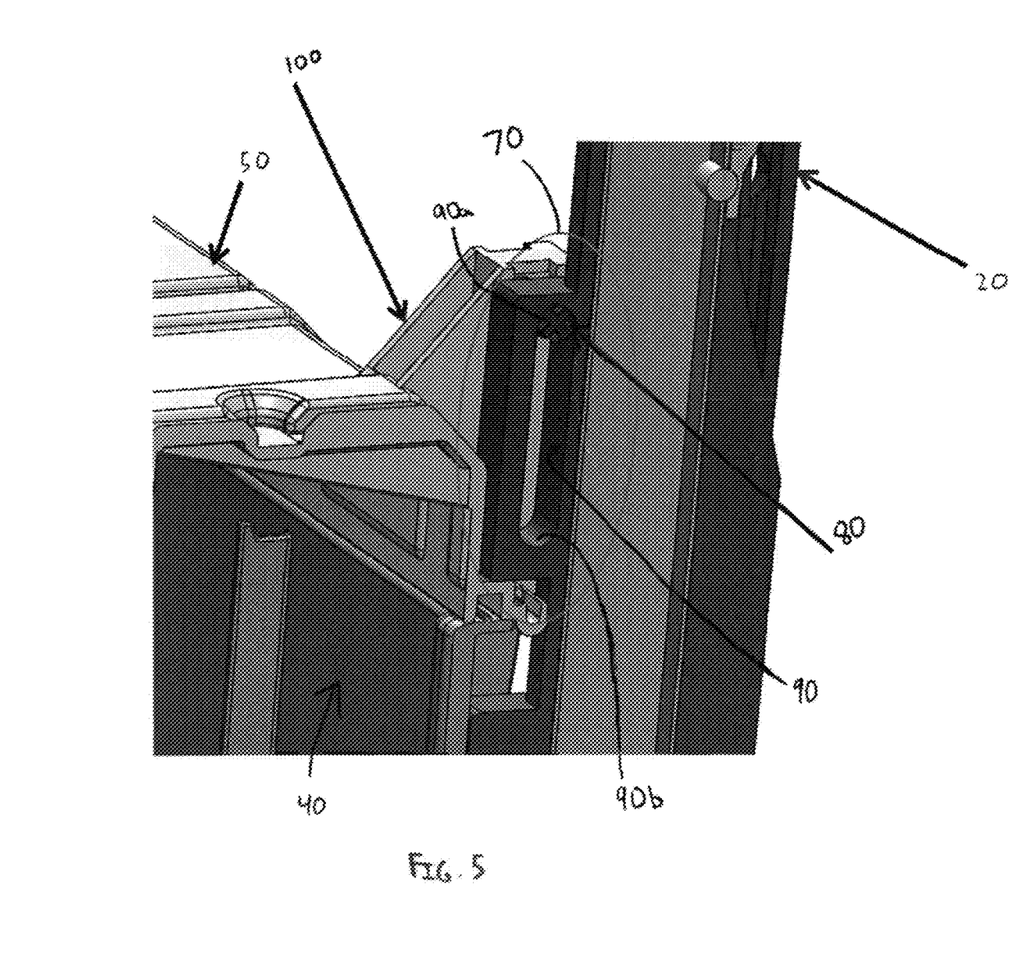
FIG. 5 illustrates an enlarged sectional view of a connection between the lid and the handle of the first embodiment, while the lid is in the closed position.
Figure 6:
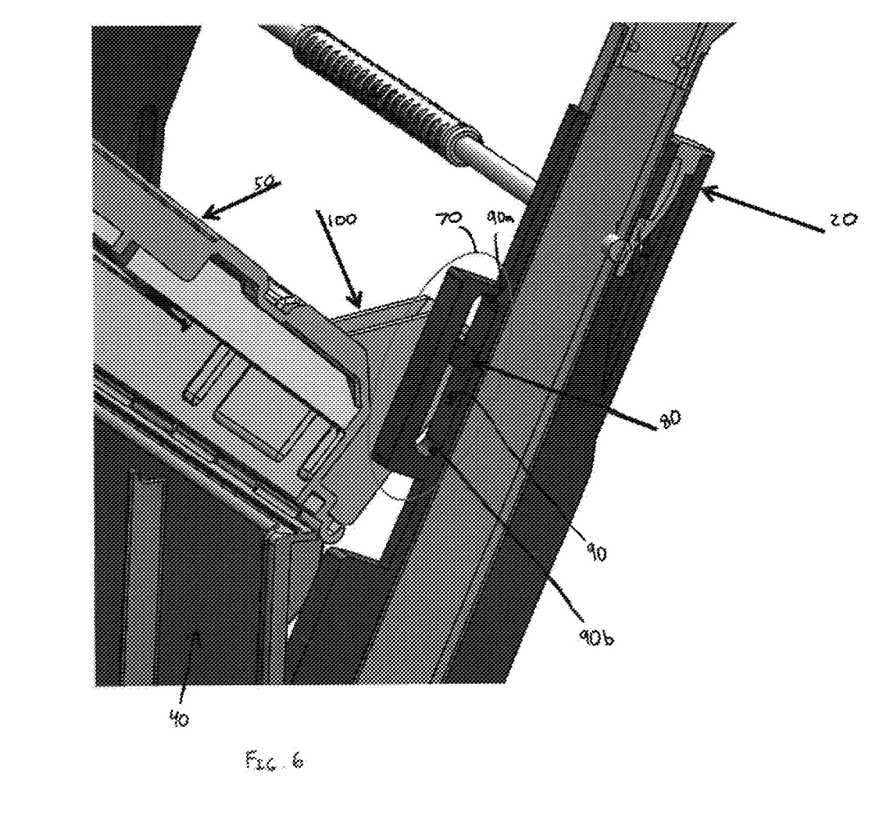
FIG. 6 illustrates an enlarged view of the connection between the lid and the handle of the first embodiment, while the lid is in the open position.
Figure 7:
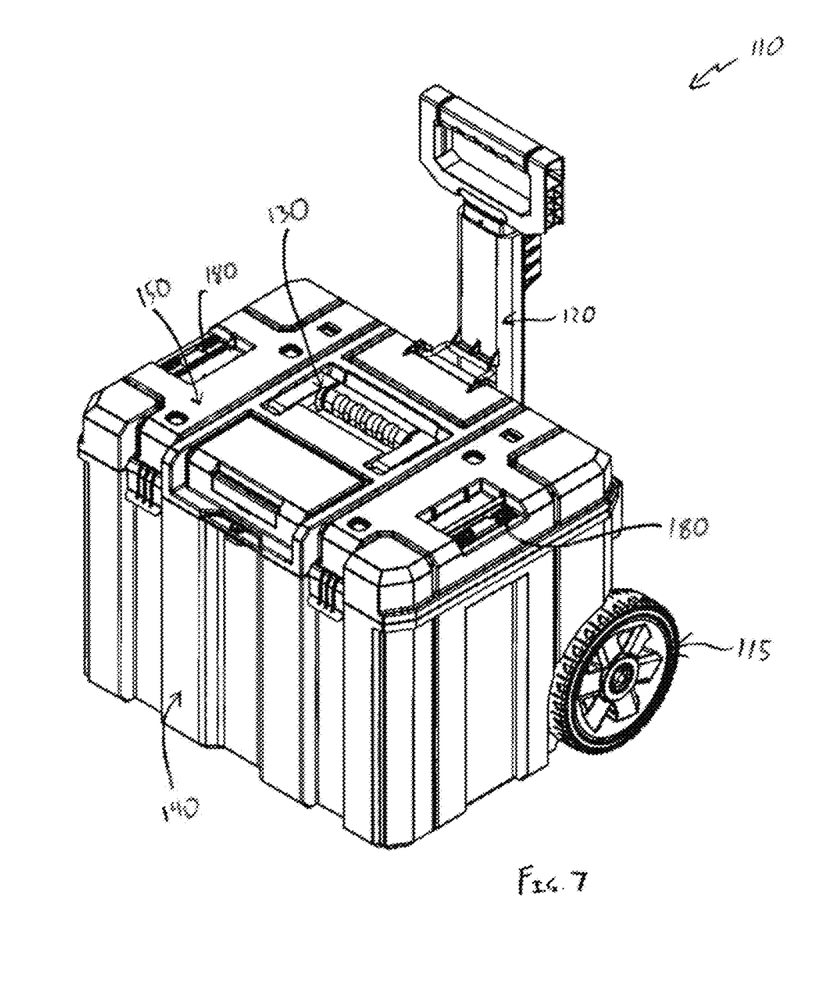
FIG. 7 illustrates a perspective view of a second embodiment of a rolling storage container, where a lid thereof is in a closed configuration and a handle thereof in a retracted configuration.
Figure 8:
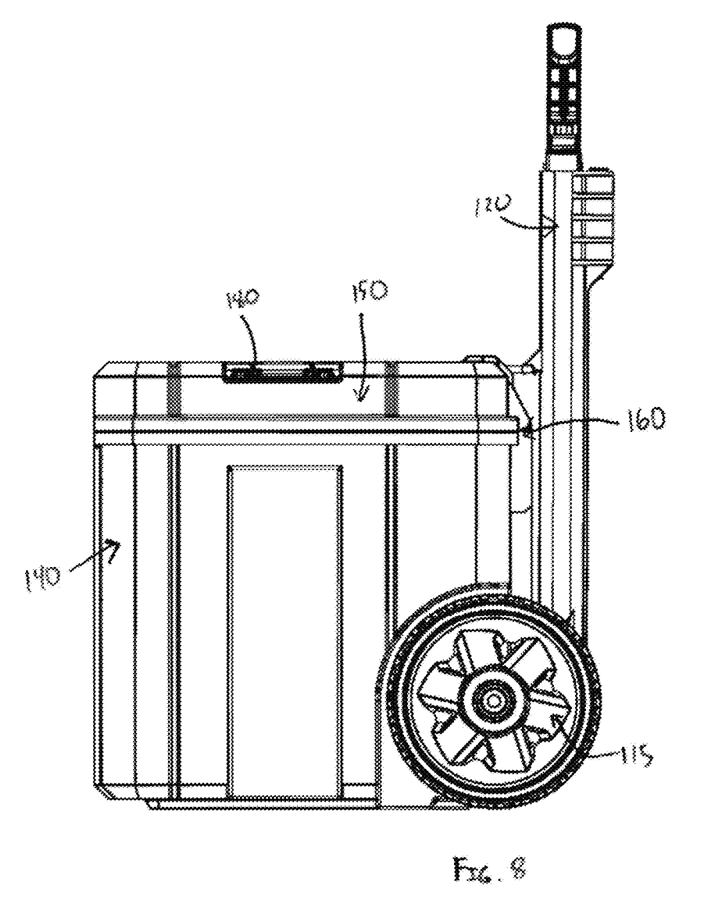
FIG. 8 illustrates a side view of the rolling storage container of FIG. 7, where a lid thereof is in a closed configuration and a handle thereof in a retracted configuration.
Figure 9:
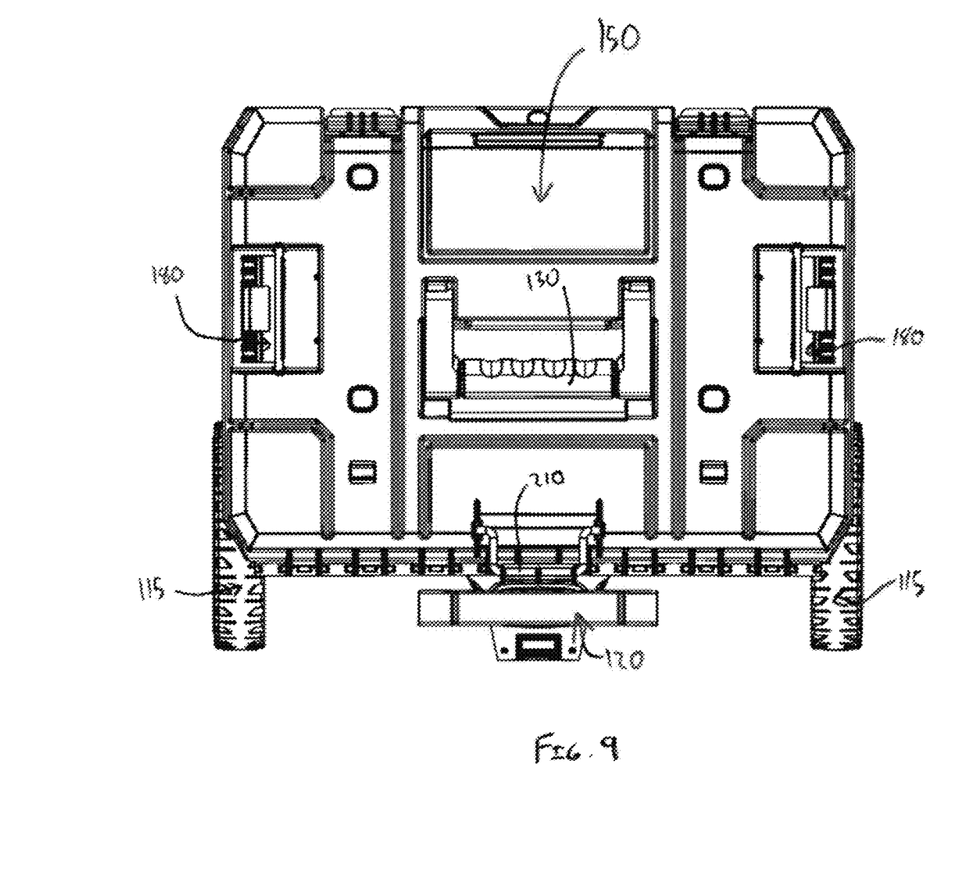
FIG. 9 illustrates a top view of the rolling storage container of FIG. 7, where a lid thereof is in a closed configuration.

As seen in greater detail with reference to the sectional perspective views of FIGS. 5 and 6, it may be appreciated that in an embodiment, the handle pivot mechanism 70 may comprise a linkage between a pivot pin 80 associated with (e.g., fixed relative to) the lid 50 and a guide path 90 associated with (e.g., fixed relative to) the handle 20. Such linkage may be configured such that a first portion 90a of the guide path 90 is associated with the lid being in a closed position, while a second portion 90b of the guide path 90 may be associated with the lid 50 in a fully open position.

As shown, the lid 50 may include a pin support 100 fixed relative thereto which may provide a connection between the pin 80 and the lid 50. In an embodiment, the pin 80 is mounted between a pair of pin supports 100 on each handle pivot mechanism 70. In other embodiments, the pin 80 might only have one pin support 100 associated therewith.

In an embodiment, a fully open position of the lid 50 may correspond with the lid 50 extending perpendicular to the opening of the body 40 of the container 10 formerly covered by the lid 50. In other embodiments, the fully open position of the lid 50 may correspond with a greater than 90 degree angle formed between the lid 50 and the opening of the body 40 of the container 10 formerly covered by the lid 50.

It may be appreciated that in FIG. 5, the lid 50 is closed relative to the body 40 of the container 10, such that the pin 80 connecting the lid 50 and the handle 20 may be seated at the first position 90a of the of the guide path 90 formed on the handle 20. As the lid 50 is gradually moved from the closed position to the open position, as is shown in FIG. 6, the pin 80 may move along the guide path 90 from the first portion 90a towards the second portion 90b, pressing appropriately on the guide path 90 and thus the handle 20, pivoting the handle 20 at the pivotal coupling to the body 40, tilting the top of the handle 20 backwards away from the body 40. Accordingly, when the lid 50 is in a fully open position, it may be horizontally out of the air-space of the body 40 of the container 10, providing unobstructed vertical access to the inside of the body 40 of the container 10.

Figure 3:
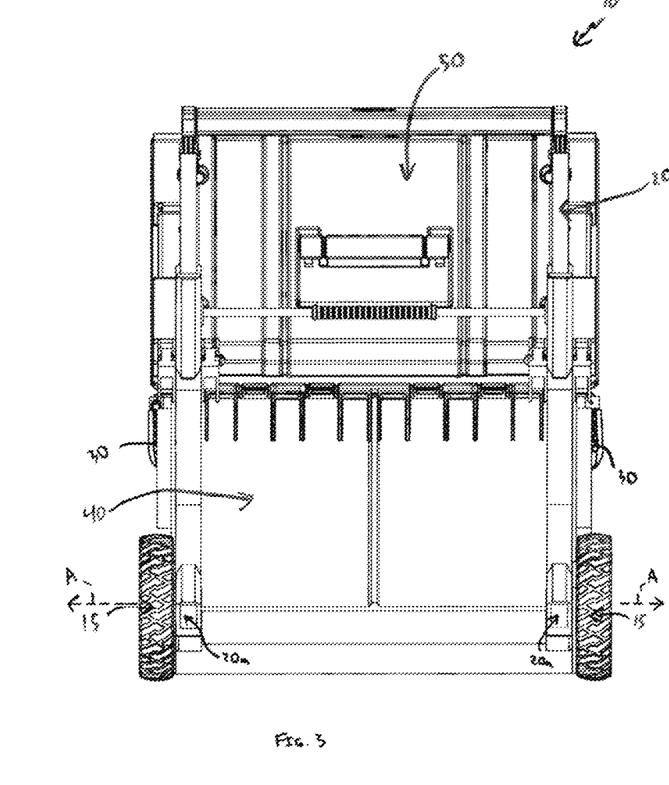
FIG. 3 illustrates a rear view of the rolling storage container of FIG. 1, with the lid thereof in an open position and a handle thereof in an extended position.

As noted above, the handle 20 may be pivotally coupled to the body 40 of the container 10. As shown in the rear view in FIG. 3, for example, in some embodiments a bottom 20a of the handle assembly may be coupled to the body 40 at a wheel axis A for the rolling storage container 10. In other embodiments the bottom of the handle assembly may be pivotally mounted elsewhere on the rolling storage container.

As is shown in FIGS. 1-6, in some embodiments of the rolling storage container 10, in some embodiments the handle 20 may be formed as an assembly. For example, in an embodiment the handle 20 may be telescoping, and configured to selectively extend from a retracted position to an extended position, further easing maneuvering of the rolling storage container. Specifically for the illustrated embodiment, FIG. 1 shows an extensible portion of the handle 20 (e.g., a crossbar 20b and extendable posts 20c thereof) retracted close to the body 40 of the rolling storage container 10, telescoped within the bottom 20a that couples to the body 40. Alternatively, as shown in FIG. 2, the extensible portion of the handle 20 may be extended (e.g., the crossbar 20b and extensible posts 20c), which may provide comfort for a user reaching to pull on the handle 20 to maneuver movement of the container 10. It may be appreciated that latches, spring biased detents, or any other appropriate mechanism may be utilized to releasably secure an extendible portion of the handle from the portion of the handle assembly that is pivotally connected to the body of the rolling storage container. For example, in an embodiment, rotation of an actuator 20d may retract detents fixing the extensible posts 20c within the bottom 20a, allowing sliding movement of the extensible posts 20c relative to the bottom 20a. In an embodiment, the detents may be spring biased, and may extend into a locking position holding the extensible posts 20c fixed relative to the bottom 20a when the handle is in a fully extended position, which may necessitate further retraction through turning or other actuation of the actuator 20d to permit the crossbar 20b to be pushed back into a retracted position relative to the bottom 20a.

In the embodiment of FIGS. 1-6, the maneuver handle 20 is formed by two spaced handle arms extending from the body 40 of the container 10, and are coupled at an upper portion thereof by the crossbar 20b (in the illustrated embodiment such coupling being on the posts 20c). It may be appreciated that other connections may be formed on the portions that are pivotally connected to the body 40 of the rolling storage container 10, and as such other handle configurations are also possible. For example, FIGS. 7-16 depict a container 110 maneuverable on wheels 115, which includes a single handle 120 located centrally between the wheels 115. Similarly to the container 10, the container 110 includes a carry handle 130 to facilitate lifting of the container 110. Additionally, the container 110 includes a body 140 on which the wheels 115 are mounted, and includes a lid 150 pivotally coupled to the body 140 via a hinged connection 160. As shown in the difference between the side view of FIG. 8 (where the lid 150 of the container 100 is in a closed configuration) and the side view of FIG. 12 (where the lid 150 of the container 110 is in an open configuration), the lid 150 may be coupled to the maneuver handle 120 in a pivotable manner, such that opening the lid 150 may pivot the maneuver handle 120 so that the lid 150 opens out of the air-space of the opening of the base 140. An embodiment of the handle pivot mechanism 170 facilitating pivotal movement of the handle 120 relative to the body 140 is described in greater detail below.

Figure 10:
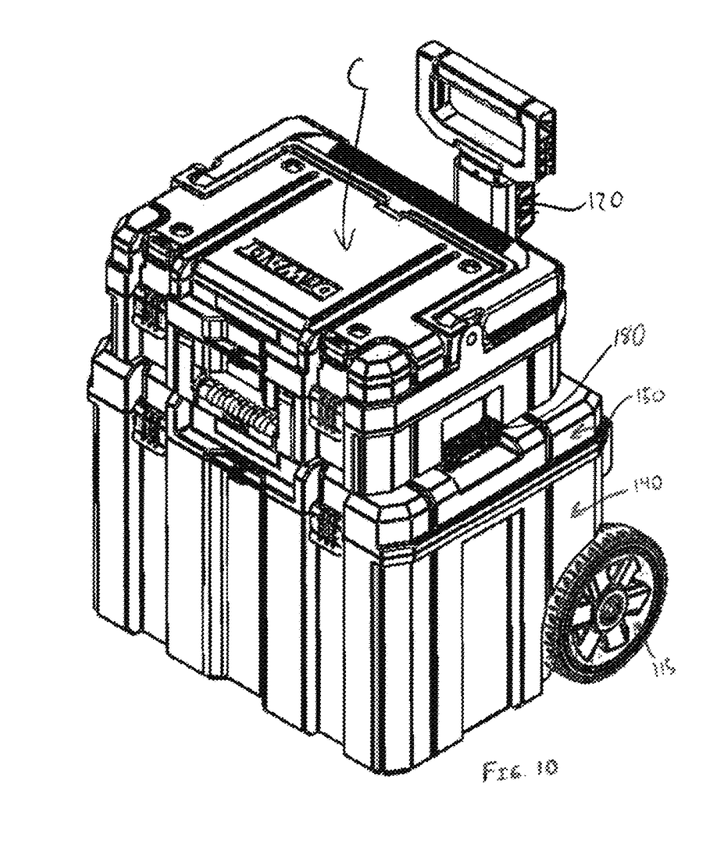
FIG. 10 illustrates the second embodiment of the rolling storage container, having an additional storage container latched thereto.

It may be appreciated that in an embodiment the lid 150 or other portions of the container 110 may include latch structures 180 configured to selectively engage receptacles on other containers to secure sets of containers together. For example, as shown in FIG. 10, where an additional container C is secured to the container 110 via the latch structures 180, maneuvering the container 110 via the handle 120 may facilitate maneuvering any containers latched thereto as well. It may be appreciated that such stacking configuration, achieved through latch structures 180 or any other appropriate mechanism, may be implemented on the embodiment container 10, or on other embodiments understood in light of this disclosure.

Figure 11:
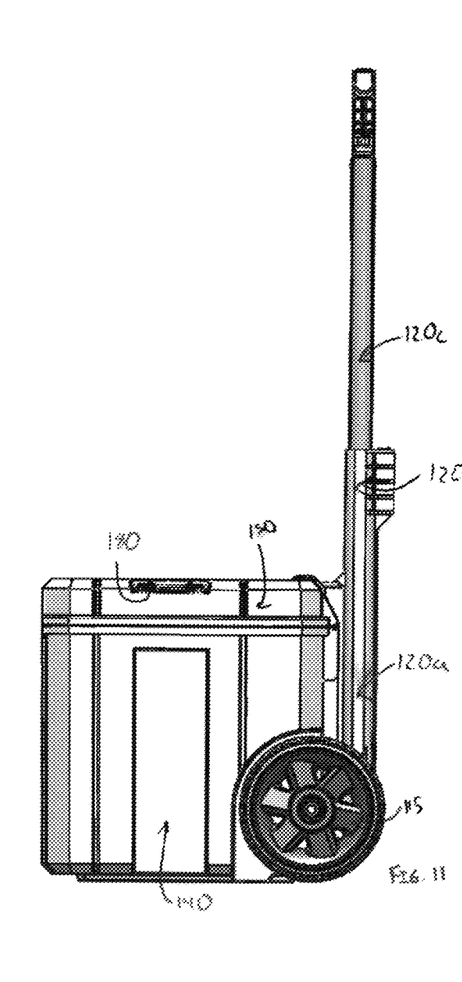
FIG. 11 illustrates the second embodiment of the rolling storage container, where the handle thereof is in an extended configuration.
Figure 12:
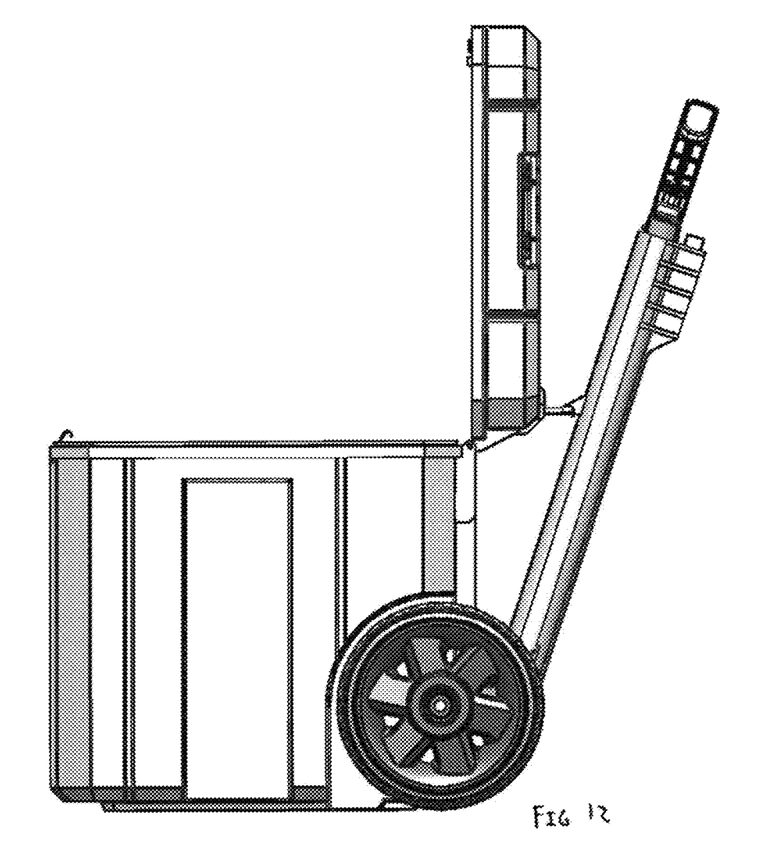
FIG. 12 illustrates a side view of the second embodiment of a rolling storage container, where a lid thereof is in an open configuration.

As shown in FIG. 11, in some embodiments of the handle 120 may also be telescopically extendible, again through any appropriate mechanism discussed herein (e.g., via those described with reference to the handle 20 of container 10) or otherwise known in the art as implementable in light of this disclosure. For example, a bottom 120a of the handle 120, which may be pivotally coupled to the body 140, while a bar 120b that is configured for user engagement may be coupled to an extensible post 120c that is telescopically coupled to the bottom 120a, allowing the bar 120b to extend to a desired height relative to the wheels 115.

Figure 13:
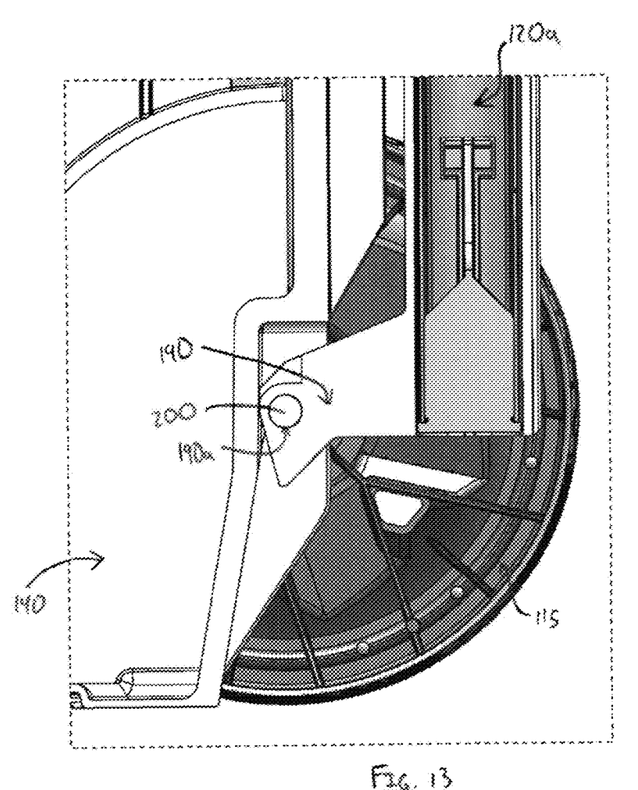
FIG. 13 illustrates an enlarged cross sectional view of an embodiment of a pivot between the handle and the wheel of the second embodiment of the rolling storage container.

FIG. 13 illustrates a cross sectional view of an embodiment of the container 110, showing the pivotable connection between the handle 120 and the body 140 thereof. As shown, in an embodiment the bottom 120a of the handle 120 may couple to (e.g., fixedly couple to) or may include thereon a pivot connector 190 that couples to a pivot axle 200 associated with (e.g., fixedly coupled to) the body 140. In an embodiment, a pivot region 190a of the pivot connector 190 may be pivotally coupled to an axis for the wheels (including in some embodiments may be coupled to the wheel axle, such that the pivot axle 200 is the wheel axle, or is collinear therewith). In other embodiments the handle 120 may be pivotally coupled elsewhere on the body 140 of the rolling container 110.

Figure 14:
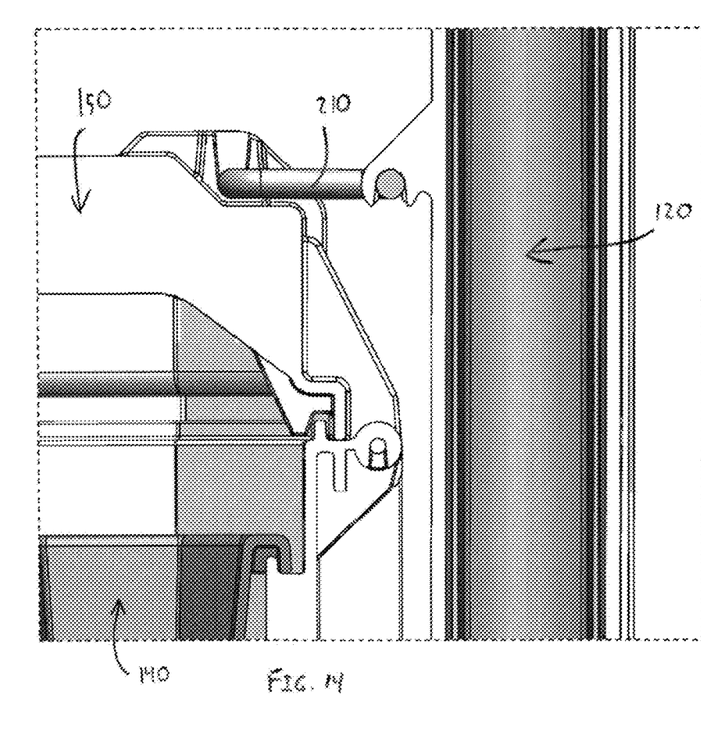
FIG. 14 illustrates an enlarged cross sectional view of an embodiment of a connection between the lid and the handle of the second embodiment of the rolling storage container.

As indicated above, in an embodiment a handle pivot mechanism 170 may facilitate pivotal movement of the handle 120 relative to the body 140. As illustrated in FIG. 14, for example, in an embodiment the handle pivot mechanism 170 may include a linkage coupling 210 between the lid 150 and the handle 120. Specifically, opening the lid 150 may cause the linkage coupling 210 to pivot at one or more of the lid 150 and the handle 120, again pushing the handle 120 away from the body 140 of the rolling container (e.g., pivoting at the pivot axle 200). In an embodiment, the linkage coupling 210 may comprise a hinge. It may be appreciated that such a coupling may be implemented on other embodiments of the rolling container 110, including but not limited to the container 10, or other embodiments understood in light of this disclosure.

Figure 15:
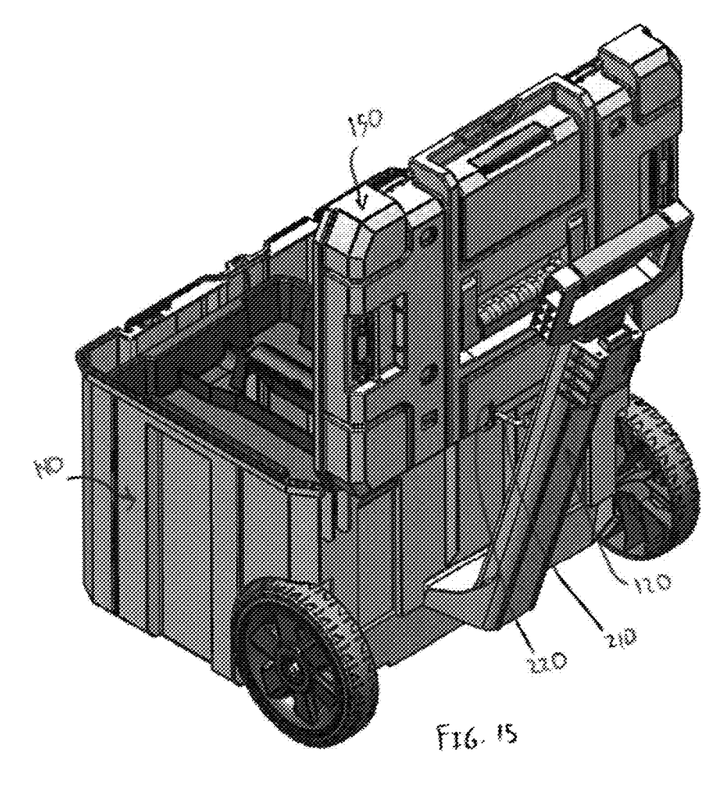
FIG. 15 illustrates a rear perspective view of the second embodiment of the rolling storage container, where the lid is in an open configuration, showing an optional removable tray in the container.
Figure 16:
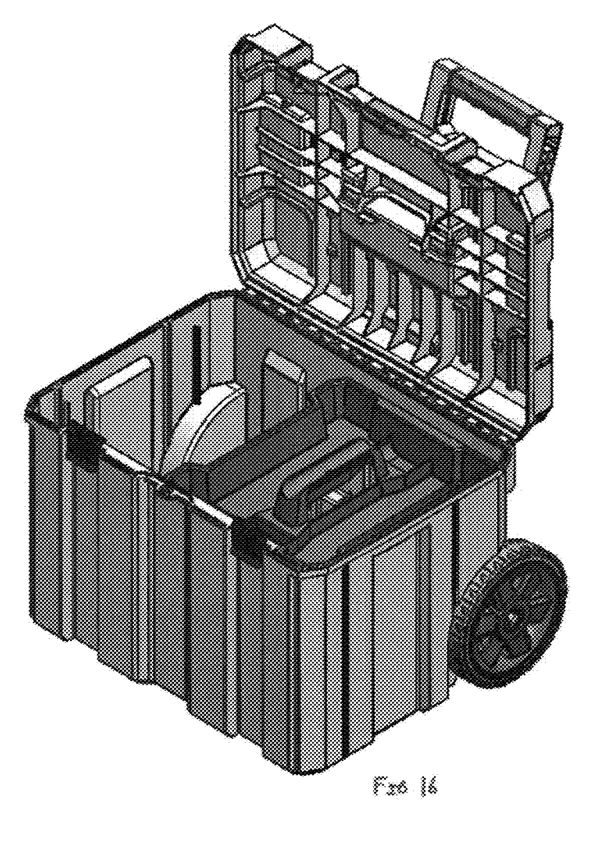
FIG. 16 illustrates a front perspective view of the second embodiment of the rolling storage container, where the lid is in the open configuration, with the optional removable tray therein.

As shown in FIG. 15, in an embodiment the lid 150 may include a recess 220 into which the pivot coupling may be received as the lid is opened or closed. As further shown in FIG. 15, as well as in FIG. 16, in an embodiment the container 110 may be shaped to receive therein a removable tray 230, which may provide further organization of tools or other materials stored in the rolling storage container 110. It may be appreciated that other embodiments of the rolling container 110, or other embodiments understood in light of this disclosure, may be configured with a lip, ledge, or other feature shaped to receive a removable tray 230, including but not limited to the container 10.

It may be appreciated that any of the components discussed in the rolling storage containers of the present application may be formed from any appropriate material in various embodiments, including metals, plastics, and combinations thereof. Additionally, in some embodiments components described above may be assemblies of subcomponents. Additionally, various components may be formed integral to one another. Assemblies of components together may be by any appropriate mechanism, including but not limited to adhesion, welds, snap fit, and fastening with fasteners (including but not limited to bolts, screws, rivets, etc.). Other modifications to the disclosure herein provided may be understood as being within the scope of claims enabled by this disclosure.

We claim:

1. A rolling container comprising:
    a body having an upper opening;
    a lid pivotally coupled to the body and movable between an open position and a closed position;
    a wheel coupled to the body, configured for rolling the body thereon;
    a maneuvering handle pivotally coupled to the body; and
    a handle pivot mechanism coupled to both the lid and the maneuvering handle, said handle pivot mechanism comprising a pivot pin movable within a guide path, and wherein, when moving said lid from its closed position to its open position, the pivot pin presses on the guide path causing the maneuvering handle to pivot away from the body.

2. The rolling container of claim 1, wherein the handle pivot mechanism is centered relative to the rolling container.

3. The rolling container of claim 1, further comprising a second handle pivot mechanism coupled to both the lid and the maneuvering handle, said second handle pivot mechanism comprising a pivot pin movable within a guide path, and wherein, when moving said lid from its closed position to its open position, the pivot pin of the second handle pivot mechanism presses on the guide path of the second handle pivot mechanism causing the maneuvering handle to pivot away from the body and wherein each handle pivot mechanism is disposed opposing ends of the rolling container.

4. The container of claim 1, wherein the maneuvering handle comprises a central post.

5. The container of claim 4, wherein the rolling container comprises a pair of wheels, and wherein the maneuvering handle couples to the body at a region central to the pair of wheels.

6. The container of claim 1, wherein the maneuvering handle comprises a pair of posts coupled by a cross bar.

7. The container of claim 1, wherein the handle pivot mechanism is configured to pivot the maneuver handle sufficiently away from the body such that the lid moves out of air-space above the upper opening, providing unobstructed vertical access to an inside of the body.

8. The container of claim 1, wherein the maneuvering handle is telescopically extensible.

9. The container of claim 8, wherein the maneuvering handle is configured to lock in one or more of a retracted and an extended position.

10. The container of claim 1, wherein the maneuvering handle is pivotally coupled to the body at a wheel axis.

11. The container of claim 10, wherein the maneuvering handle is pivotally coupled to an axle of the wheel.

12. The container of claim 1, further comprising latches on the lid configured to secure an additional container to the rolling container.

13. The container of claim 1, further comprising one or more carrying handles, positioned on one or more of the lid and the body.

14. A rolling container comprising:
    a body having an opening;
    a lid pivotally disposed on said body and covering said opening in a first position and uncovering said opening in a second position;
    a wheel secured on said body to allow said body to be rolled on the ground;
    a handle pivotally couple on said body;

a guide path disposed on one of said lid and said handle; and a pivot pin disposed on the other of said lid and said handle and movable within said guide path; wherein, when said lid is pivoted from said first position to said second position, said pin travels in said guide path to force said handle to pivot away from said body.

15. The rolling container recited in claim 14, wherein, said pivot pin is disposed on said lid and guide path is disposed on said handle.

16. The rolling container recited in claim 15, said pivot pin disposed near a lower end of said guide path when said lid is in said first position.

17. A rolling container comprising:
a body having an opening;
a lid pivotally disposed on said body and covering said opening in a first position and uncovering said opening in a second position;
a wheel secured on said body to allow said body to be rolled on the ground;
a handle pivotally coupled on said body;
a hinge pivotally linked at one end thereof to one of said lid and said handle and linked at the other end thereof to the other of said lid and said handle; wherein, when said lid is pivoted from said first position to said second position, said hinge pushes said handle to pivot said handle away from said body.

18. The rolling container recited in claim 17, where said hinge is pivotally linked at one end to said lid and is linked to the handle at the other end, said rolling container further comprising a recess disposed in the surface of said lid, said hinge received in said recess when said lid is in said first position.

* * * * *